(12) United States Patent
Pistoia et al.

(10) Patent No.: US 10,218,777 B2
(45) Date of Patent: Feb. 26, 2019

(54) SYSTEM, METHOD AND APPARATUS FOR AD-HOC UTILIZATION OF AVAILABLE RESOURCES ACROSS MOBILE DEVICES

(71) Applicant: International Business Machines Corporation, Armonk, NY (US)

(72) Inventors: Marco Pistoia, Amawalk, NY (US); Gegi Thomas, Piermont, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/184,220

(22) Filed: Jun. 16, 2016

(65) Prior Publication Data
US 2017/0367086 A1 Dec. 21, 2017

(51) Int. Cl.
*H04L 29/08* (2006.01)
*H04W 4/60* (2018.01)
*G06F 9/50* (2006.01)
*H04W 84/18* (2009.01)

(52) U.S. Cl.
CPC ............ *H04L 67/10* (2013.01); *G06F 9/5061* (2013.01); *H04W 4/60* (2018.02); *H04W 84/18* (2013.01)

(58) Field of Classification Search
CPC ... H04W 72/048; H04W 4/003; H04W 84/18; H04L 67/10; G06F 9/5061
See application file for complete search history.

(56) References Cited

U.S. PATENT DOCUMENTS

| | | |
|---|---|---|
| 7,181,521 B2 | 2/2007 | Knauerhase et al. |
| 2007/0038754 A1* | 2/2007 | Nunez .................... G06Q 10/06 709/226 |
| 2008/0039125 A1 | 2/2008 | Fan et al. |
| 2010/0022231 A1 | 1/2010 | Heins et al. |
| 2010/0150120 A1 | 6/2010 | Schlicht et al. |
| 2013/0109364 A1 | 5/2013 | Mercuri et al. |
| 2013/0254281 A1* | 9/2013 | Sun ......................... G06Q 10/10 709/204 |
| 2014/0194065 A1 | 7/2014 | Hollick et al. |
| 2014/0351310 A1* | 11/2014 | Ligman ............. H04W 52/0209 709/201 |

(Continued)

OTHER PUBLICATIONS

Brunner, G., "MIT's mobile hotspot sharing app aims for free P2P data coverage", http://www.extremetech.com/mobile/146912-mit-mobile-hotspot-service, Jan. 28, 2013, 8 pages.

(Continued)

*Primary Examiner* — Min Jung
(74) *Attorney, Agent, or Firm* — Scully, Scott, Murphy & Presser, P.C.; Daniel Morris, Esq.

(57) ABSTRACT

A method of collaboratively executing a task using first to N-th mobile devices in an ad-hoc network includes determining collaborative mobile devices out of the second to N-th mobile devices, receiving information corresponding to the collaborative mobile devices, dividing the task into first to M-th sub tasks, assigning each of the first to M-th sub tasks to at least one of the collaborative mobile devices, requesting executions of the first to M-th sub tasks to the collaborative mobile devices, and receiving execution results of the first to M-th sub tasks from the collaborative mobile devices. M and N are integers greater than one.

19 Claims, 14 Drawing Sheets

(56) References Cited

U.S. PATENT DOCUMENTS

| | | | | |
|---|---|---|---|---|
| 2015/0215243 | A1* | 7/2015 | Xu | G06Q 50/10 |
| | | | | 709/206 |
| 2015/0317595 | A1* | 11/2015 | De | G06Q 10/06 |
| | | | | 705/7.15 |
| 2016/0072917 | A1* | 3/2016 | Huang | H04L 67/10 |
| | | | | 709/202 |
| 2017/0300363 | A1* | 10/2017 | Liu | G06F 9/5083 |

OTHER PUBLICATIONS

Han, S., et al., "Energy Saving of Mobile Devices Based on Component Migration and Replication in Pervasive Computing" UIC 2006, LNCS, Sep. 2006, pp. 637-647, vol. 4159.

Zaa, M., et al., "A Survey on Migration of Task Between Cloud and Mobile Device", International Journal of Advanced Research in Computer Engineering & Technology (IJARCET), Feb. 2013, pp. 610-613, vol. 2, Issue 2.

* cited by examiner

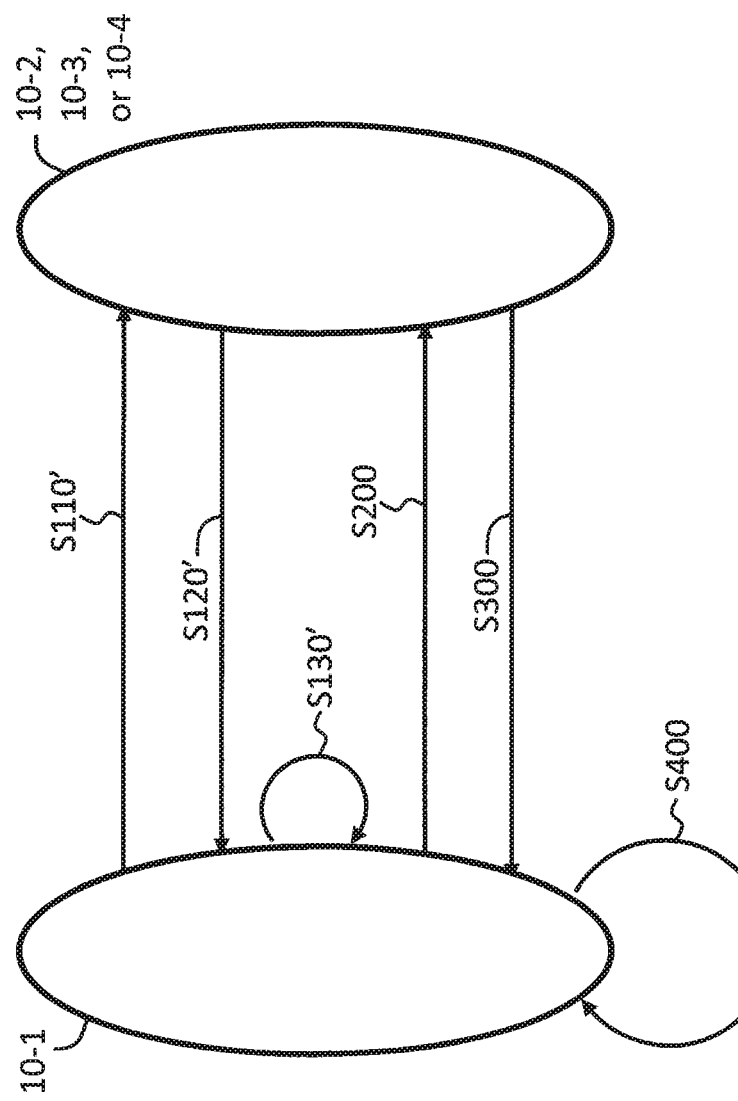

| MD Index | Resource Types | Status |
|---|---|---|
| 2 (e.g., 10-2) | Processor usage ratio | 0% (e.g., idle) |
| | Installed mobile applications | APP1 to APP4 |
| | Remained battery power level | 90% |
| 3 (e.g., 10-3) | Processor usage ratio | 50% |
| | Installed mobile applications | APP1 to APP3 |
| | Remained battery power level | 100% |
| 4 (e.g., 10-4) | Processor usage ratio | 0% |
| | Installed mobile applications | APP2 to APP4 |
| | Remained battery power level | 100% |

FIG. 7

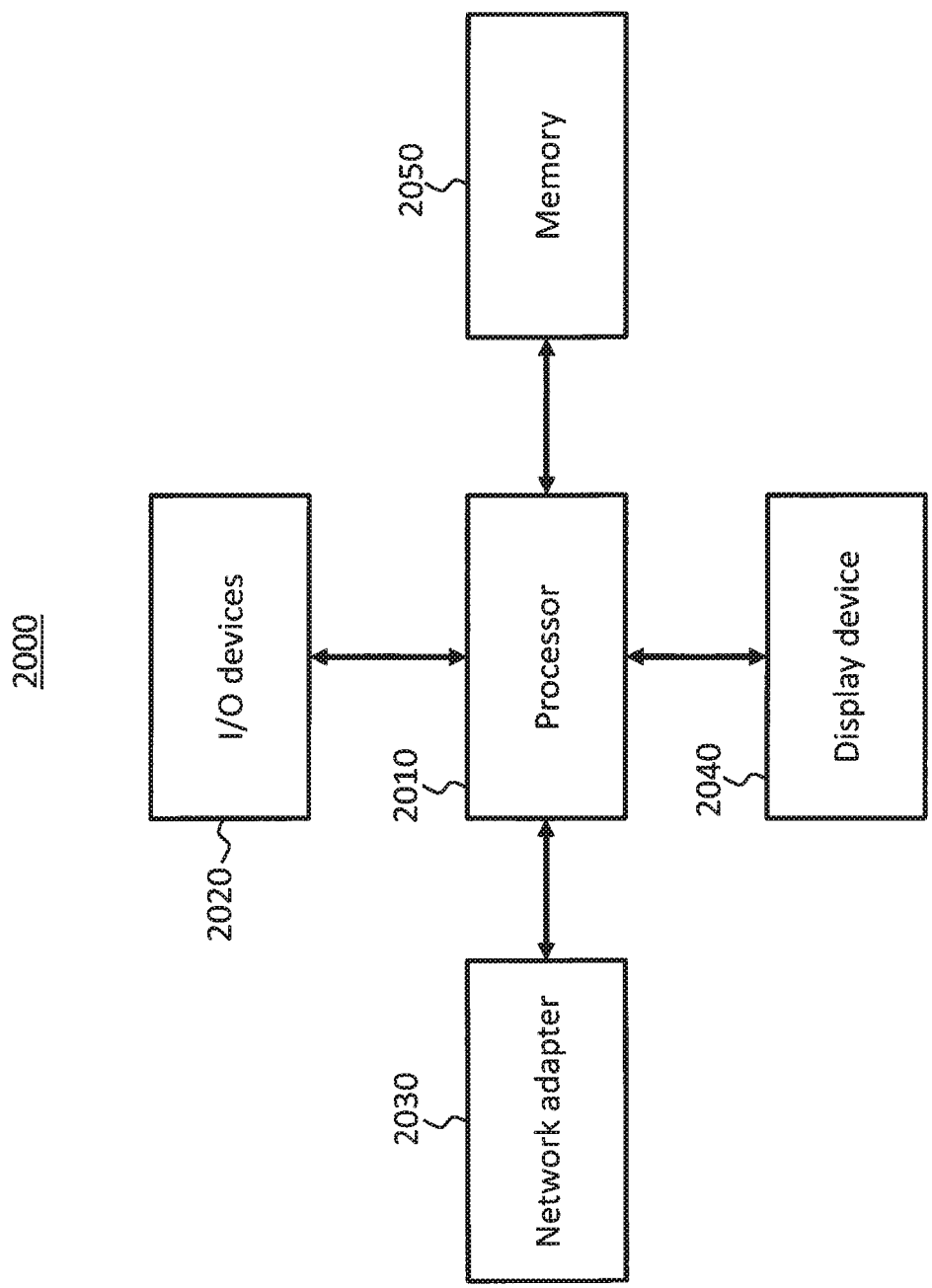

SYSTEM, METHOD AND APPARATUS FOR AD-HOC UTILIZATION OF AVAILABLE RESOURCES ACROSS MOBILE DEVICES

BACKGROUND

The present disclosure relates to a method for collaboratively executing a task in a mobile ad-hoc network, and more particularly to a method for collaboratively executing a task using available shared resources of mobile devices in the mobile ad-hoc network, the mobile ad-hoc network for performing the method, and a computer program product for performing the method.

Mobile technologies are gaining fast momentum and rapid popularity. As such, they are also becoming dominant within organizations. An important aspect of mobile devices is that these devices carry out general computations, yet have limited capabilities and resources such as computations, storages, battery power, or the like. Thus, when a task (e.g., a mobile application) runs exclusively in the mobile devices, resources of each mobile device may easily be diminished, resulting in a temporary loss of resources availability, while other mobile devices are in a state where no task is being executed, thereby freeing up mobile device resources.

SUMMARY

Aspects of the present disclosure are a method for executing a task using available shared resources of mobile devices in a mobile ad-hoc network and a system for performing the method to efficiently allocate, distribute, and optimize the resources of the mobile devices.

According to an exemplary embodiment, a method for collaboratively executing a task using first to N-th mobile devices in an ad-hoc network is provided. The first mobile device has the task to be executed and N is an integer greater than one. The method includes determining collaborative mobile devices out of the second to N-th mobile devices, receiving information corresponding to the collaborative mobile devices, dividing the task into first to M-th sub tasks (M is an integer greater than one), assigning each of the first to M-th sub tasks to at least one of the collaborative mobile devices, requesting executions of the first to M-th sub tasks to the collaborative mobile devices, receiving execution results of the first to M-th sub tasks from the collaborative mobile devices, and combining the execution results of the first to M-th sub tasks one with another in response to completion of the requested executions.

According to an exemplary embodiment, a network system of collaboratively executing a task is provided. The mobile ad-hoc network system includes first to N-th mobile devices and a server device. N is an integer greater than one, and the first to N-th mobile devices constitute the mobile ad-hoc network. The first mobile device has the task to be executed, queries available resources of the second to N-th mobile devices to the server device, receives identifications (IDs) of collaborative mobile devices, divides the task into first to M-th sub tasks, assigns each of the first to M-th sub tasks to at least one of the collaborative mobile devices, requests executions of the first to M-th sub tasks to the collaborative mobile devices, receives execution results of the first to M-th sub tasks from the collaborative mobile devices, and combines the execution results of the first to M-th sub tasks one with another in response to completion of the requested executions. M is an integer greater than one. The server device receives resource information from the second to N-th mobile devices, determines the collaborative mobile devices out of the second to N-th mobile devices based on the resource information, and provides the IDs of the collaborative mobile devices to the first mobile device. Each of the collaborative mobile devices executes at least one of the assigned first to M-th sub tasks and provides the execution results with the first mobile device.

According to an exemplary embodiment, a computer program product is provided. The computer program product is stored in a non-transitory computer-readable storage medium having computer readable program instructions. The computer readable program instructions read and carried out by a processor for performing a method of collaboratively executing a task using first to N-th mobile devices in an ad-hoc network. The method includes determining collaborative mobile devices out of the second to N-th mobile devices, receiving information corresponding to the collaborative mobile devices, dividing the task into first to M-th sub tasks, wherein M and N are integers greater than one, assigning each of the first to M-th sub tasks to at least one of the collaborative mobile devices, requesting executions of the first to M-th sub tasks to the collaborative mobile devices, receiving execution results of the first to M-th sub tasks from the collaborative mobile devices and combining the execution results of the first to M-th sub tasks one with another in response to completion of the requested executions.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 3A is a diagram illustrating a task execution method using available resources of collaborative mobile devices in which the collaborative mobile devices are determined by a target mobile device, according to an exemplary embodiment;

FIG. 7 is a diagram illustrating examples of resource information according to an exemplary embodiment;

FIG. 10 is a block diagram illustrating a server computing system according to an exemplary embodiment.

DETAILED DESCRIPTION OF THE EMBODIMENTS

Figure 1B:
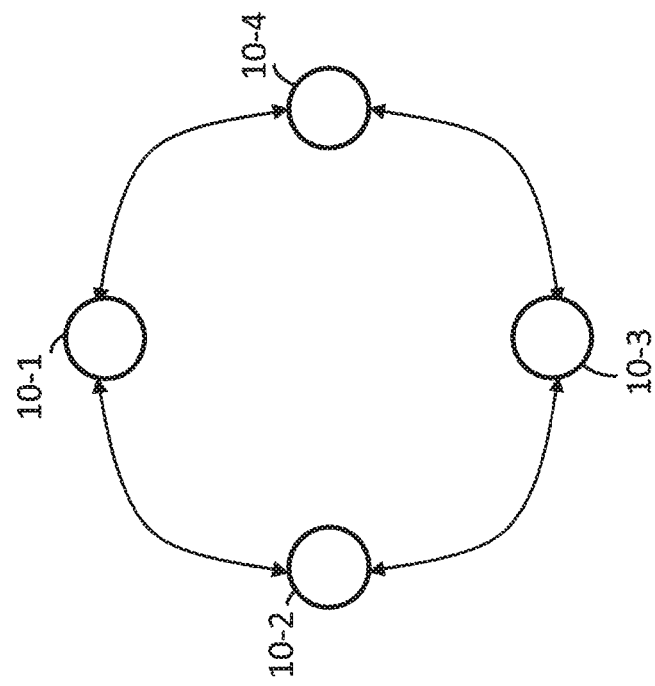
FIGS. 1A and 1B are diagrams illustrating mobile ad-hoc networks according to an exemplary embodiment.

Like reference numerals may refer to like elements throughout the written descriptions and drawings.

Figure 1A:
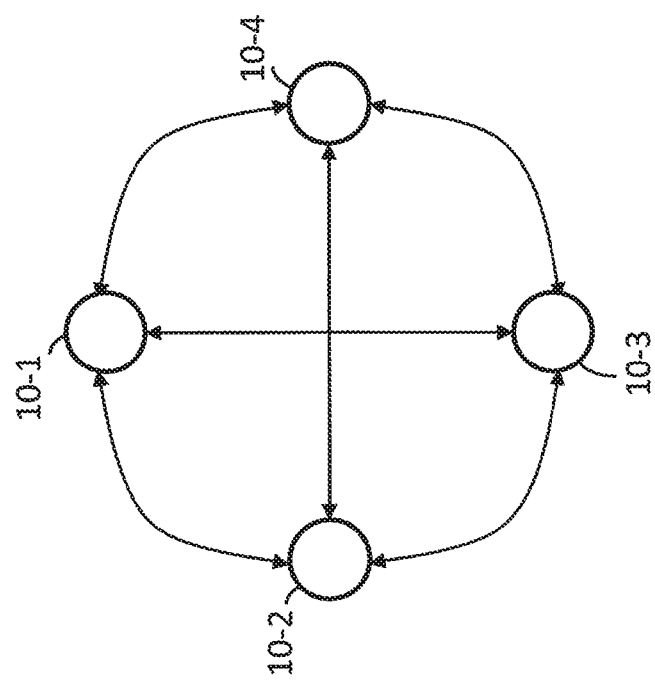

FIGS. 1A and 1B are diagrams illustrating mobile ad-hoc networks according to an exemplary embodiment.

Referring to FIGS. 1A and 1B, each mobile ad-hoc network in an exemplary embodiment includes a plurality of mobile devices 10-1 to 10-4 connected one with another via wireless communication channels. The mobile ad-hoc network may include a peer-to-peer wireless network. The mobile ad-hoc network may be built based on at least one of communication technologies such as code division multiple access (CDMA), global system for mobile communication (GSM), wideband CDMA, CDMA-2000, time division multiple access (TDMA), long term evolution (LTE), wireless local area network (LAN), Bluetooth, or the like.

In an exemplary embodiment of the mobile ad-hoc network, as illustrated in FIG. 1A, the mobile devices 10-1 to 10-4 are wirelessly connected one with another based on a mesh network topology, so that they exchange data via the direct wireless communication channels.

For example, the mobile device 10-1 exchanges data with the mobiles devices 10-2 to 10-4 in a direct manner via wireless communication channels. Similarly, the mobile device 10-2 exchanges data with the mobiles 10-1, 10-3 and 10-4 in a direct manner via the wireless communication channels. The mobile device 10-3 exchanges data with the mobiles devices 10-1, 10-2 and 10-4 in a direct manner via the wireless communication channels. The mobile device 10-4 exchanges data with the mobiles devices 10-1 to 10-3 in a direct manner via the wireless communication channels.

In an exemplary embodiment of the mobile ad-hoc network, as illustrated in FIG. 1B, the mobile devices 10-1 to 10-4 are not fully connected one with another. For example, referring to FIG. 1B, while direct wireless communication channels are setup between the mobile device 10-1 and the mobile devices 10-2 and 10-4, there is no setup direct wireless communication channel between the mobile device 10-1 and the mobile device 10-3. Instead, the mobile device 10-3 may exchange data or a signal via either the mobile device 10-2 or 10-4.

Referring to FIGS. 1A and 1B, the mobile devices 10-1 to 10-4 may be in a trusted relationship in the mobile ad-hoc network, may be authenticated using a security technology when joining to the network and agreed to grant rights to access or share data or resources thereof.

For the sake of simplicity, although the number of mobile devices in each mobile ad-hoc network is illustrated as four in FIGS. 1A and 1B, the number of mobile devices in each mobile ad-hoc network of the present disclosure is not limited thereto.

In addition, in an exemplary embodiment, mobile devices in a mobile ad-hoc network may be different one from another in performances and elements therein. For example, the mobile devices may contain different sizes or types of resources one from another and their availabilities may vary over a time. Each mobile device has limited resources unlike stationary devices such as a computing server, a router, a desktop computer, or the like.

Therefore, the mobile device may lack resources required to execute a task given thereto, and thus, importance of efficient resource management in the mobile devices may be emphasized than the stationary devices.

In an example of such a resource management method, various tasks (e.g., operations) such as execution of a mobile application, various computations, storage of data, or the like may be conducted by sharing or using available resources (e.g., excessive resources) of neighboring mobile devices in a mobile ad-hoc network rather than being conducted by only resources of a single mobile device to improve overall system performance.

For example, when a particular task is required to be conducted in a single mobile device, the mobile device may determine whether the required task can be conducted by relying on only its own resources; if not, the mobile device may determine to conduct the corresponding task by sharing available resources of the neighboring mobile devices. In an exemplary embodiment, even if the task can be conducted with only its own resources, the mobile device may determine to conduct the corresponding task by sharing available resources of the neighboring mobile devices if it is determined that conducting the task by sharing the available resources of the neighboring mobile devices is more efficient than conducting the task using only its own resources.

Hereinafter, for the sake of simplicity of description, the mobile device in which the particular task is required to be conducted may be referred to as a "target mobile device" and the neighboring mobile devices in the mobile ad-hoc network may be referred to as "neighboring mobile devices".

Figure 2A:
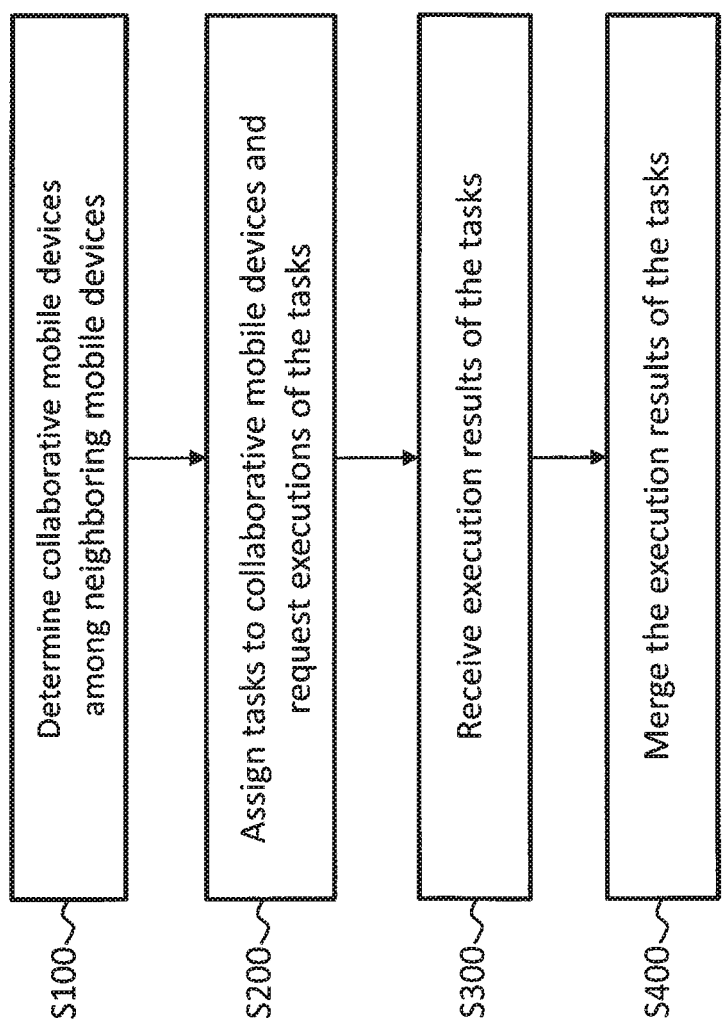
FIG. 2A is a flowchart illustrating a task execution method according to an exemplary embodiment.

As illustrated in FIG. 2A, the task execution method using the available resources of the neighboring mobile devices may include determining collaborative mobile devices among neighboring mobile devices 10-2 to 10-4 (S100), assigning tasks, which are required to be executed, to the collaborative mobile devices and requesting executions of the tasks to the collaborative mobile devices (S200), receiving execution results of the tasks (S300), and merging (e.g., combining) the execution results of the tasks (S400).

Here, the collaborative mobile devices may be referred to as mobile devices having available resources for executions of tasks, which are supposed to be executed in the target mobile device 10-1.

Figure 2B:
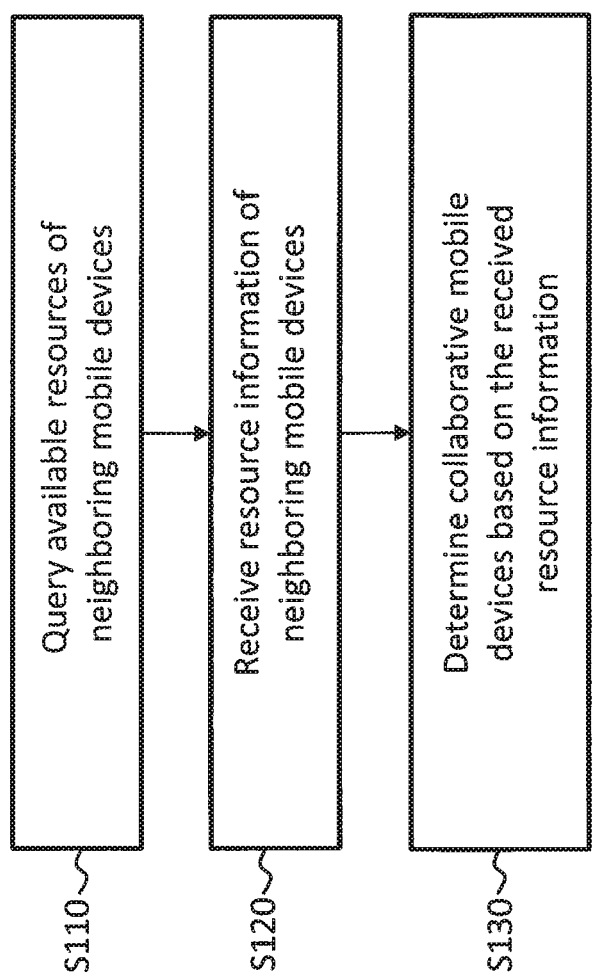
FIG. 2B is a flowchart illustrating a step S100 of FIG. 2A according to an exemplary embodiment.

Referring to FIG. 2B, the step S100 may further include querying available resources of the neighboring mobile devices 10-2 to 10-4 (S110), receiving resource information of the neighboring mobile devices 10-2 to 10-4 (S120), and determining the collaborative mobile devices based on the received resource information (S130).

In an exemplary embodiment, the steps of querying the available resources and receiving the resource information may be conducted based on direct communications (e.g., peer-to-peer communications) among the target mobile device 10-1 and each of the neighboring mobile devices 10-2 to 10-4.

FIG. 3A is a diagram illustrating a task execution method using available resources of collaborative mobile devices in which the collaborative mobile devices are determined by the target mobile device, according to an exemplary embodiment.

Referring to FIG. 3A, the target mobile device 10-1, in which a task is required to be executed, may communicate a query requesting available resources of the neighboring mobile devices 10-2 to 10-4 (S110') over the mobile ad-hoc network, the neighboring mobile devices 10-2 to 10-4 may transmit resource information to the target mobile device 10-1 and the target mobile device 10-1 may receive the resource information (S120') over the mobile ad-hoc network, and the target mobile device 10-1 may determine collaborative mobile devices out of the neighboring mobile devices 10-2 to 10-4 based on the received resource information. In addition, the target mobile device 10-1 may assign tasks, which are required to be executed, to the collaborative mobile devices and request executions of the tasks over the mobile ad-hoc network (S200). In addition, each collaborative mobile device may execute at least one task assigned to the collaborative mobile devices and provide execution results of the tasks with the target mobile device 10-1 over the mobile ad-hoc network (S300), and the target mobile device 10-1 may merge (e.g., combine) the execution results of the tasks (S400).

Here, all the communications among the target mobile device 10-1 and each of the neighboring mobile devices 10-2 to 10-4 may be conducted based on direct wirelessly communication channels therebetween over the mobile ad-hoc network, for example, as an exemplary embodiment described with reference to FIG. 1A. However, at least one of the communications among the target mobile device 10-1 and each of the neighboring mobile devices 10-2 to 10-4 may be conducted based on indirect wireless communication channels therebetween over the mobile ad-hoc network, for example, as an exemplary embodiment described with reference to FIG. 1B.

Referring back to FIG. 3A, in an exemplary embodiment, transmission (e.g., S120') of the resource information from the neighboring mobile devices 10-2 to 10-4 to the target mobile device 10-1 might not be conducted in response to the query (e.g., S110') from the target mobile device 10-1. For example, each of the neighboring mobile devices 10-2 to 10-4 may broadcast its resource information with IDs (e.g., indices) thereof even if the query from the target mobile device 10-1 is not received over the mobile ad-hoc network. The resource information may include, for example, a mobile device ID, a resources usage ratio (e.g., processor usage ratio) in percentage, a remained battery power level, installed mobile applications, or the like. The resource information will be described in more detail with reference to FIG. 8.

Figure 3B:
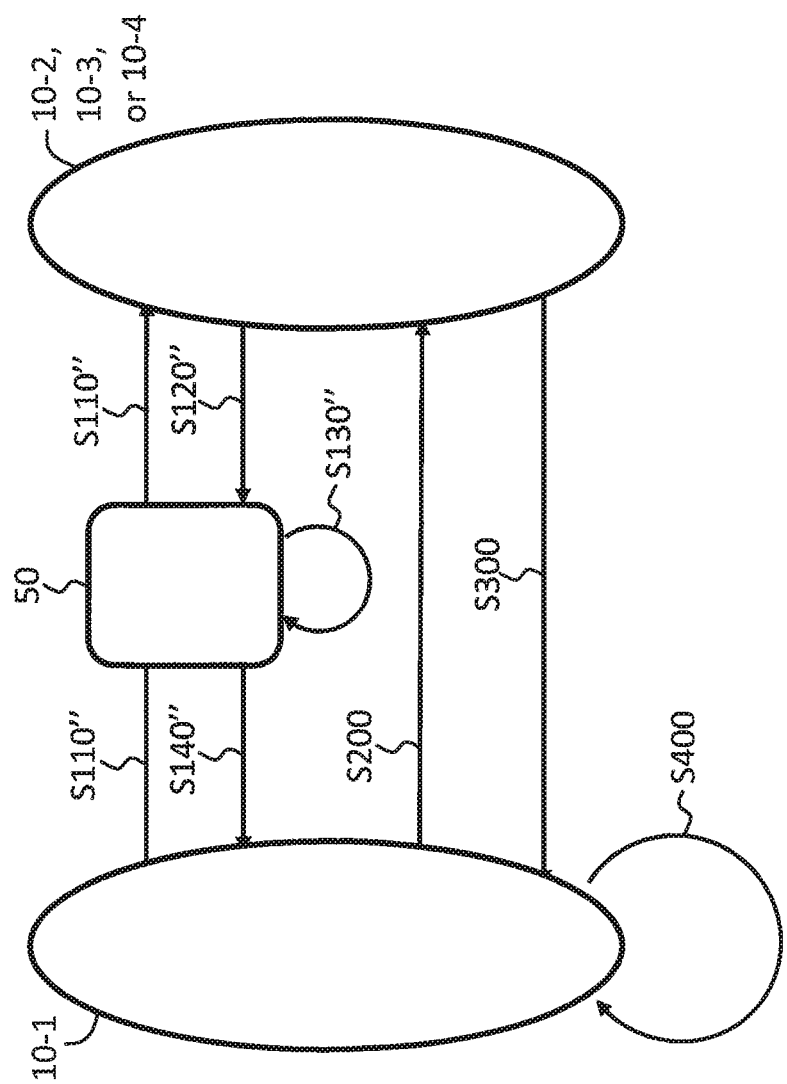
FIG. 3B is a diagram illustrating a task execution method using available resources of collaborative mobile devices in which the collaborative mobile devices are determined via a server device, according to an exemplary embodiment.

In an exemplary embodiment shown in FIG. 3B, the steps S110" and S120" of querying the available resources and receiving the resource information may be conducted using a server device 50.

FIG. 3B is a diagram illustrating a task execution method using available resources of collaborative mobile devices in which the collaborative mobile devices are determined via a server device 50, according to an exemplary embodiment.

Referring to FIG. 3B, the target mobile device 10-1, in which a task is required to be executed, may communicate a query requesting available resources of the neighboring mobile devices 10-2 to 10-4 to the server device 50 over a wireless network (e.g., a network based on CDMA, GSM, wideband CDMA, CDMA-2000, TDMA, LTE, wireless LAN, Bluetooth, or the like), and the server device 50 may forward the query to each of the neighboring mobile devices 10-2 to 10-4 (S110") over the wireless network other than the mobile ad-hoc network. As described above, the mobile devices 10-1 to 10-4 may constitute a mobile ad-hoc network and communicate with each other over the mobile ad-hoc network. However, in an embodiment, the server device 50 is not included in the mobile ad-hoc network and communicates with the mobile devices 10-1 to 10-4 over other networks than the above ad-hoc network, based on. e.g., CDMA, GSM, wideband CDMA, CDMA-2000, TDMA, LTE, wireless LAN, Bluetooth, or the like. In addition, each of the neighboring mobile devices 10-2 to 10-4 may provide resource information with the server device 50 and the server device 50 may receive the resource information over the wireless network other than the mobile ad-hoc network (S120"). The server device 50 may determine the collaborative mobile devices to assign tasks to based on the resource information (S130") and provide IDs (e.g., indices) of the collaborative mobile devices with the target mobile device 10-1 (S140"). The target mobile device 10-1 may receive IDs of the collaborative mobile devices from the server device 50 over the wireless network other than the mobile ad-hoc network (S140"). In addition, the target mobile device 10-1 may assign tasks, which are required to be executed, to the collaborative mobile devices and request executions of the tasks based on the received IDs of the collaborative mobile devices over the mobile ad-hoc network (S200). In addition, each collaborative mobile device may execute at least one task assigned thereto and provide execution results of the tasks with the target mobile device 10-1 over the mobile ad-hoc network (S300), and the target mobile device 10-1 may merge (e.g., combine) the execution results of the tasks (S400). In an embodiment, the steps S300 and S400 may be conducted over the wireless network other than the mobile ad-hoc network.

Here, all the communications among the target mobile device 10-1 and each of the neighboring mobile devices 10-2 to 10-4 may be conducted based on direct wireless connections therebetween over the mobile ad-hoc network; for example, as an exemplary embodiment described with reference to FIG. 1A. However, at least one of the communications among the target mobile device 10-1 and each of the neighboring mobile devices 10-2 to 10-4 may be conducted based on indirect wireless communication channels therebetween over the mobile ad-hoc network, for example, as an exemplary embodiment described with reference to FIG. 1B.

Figure 3C:
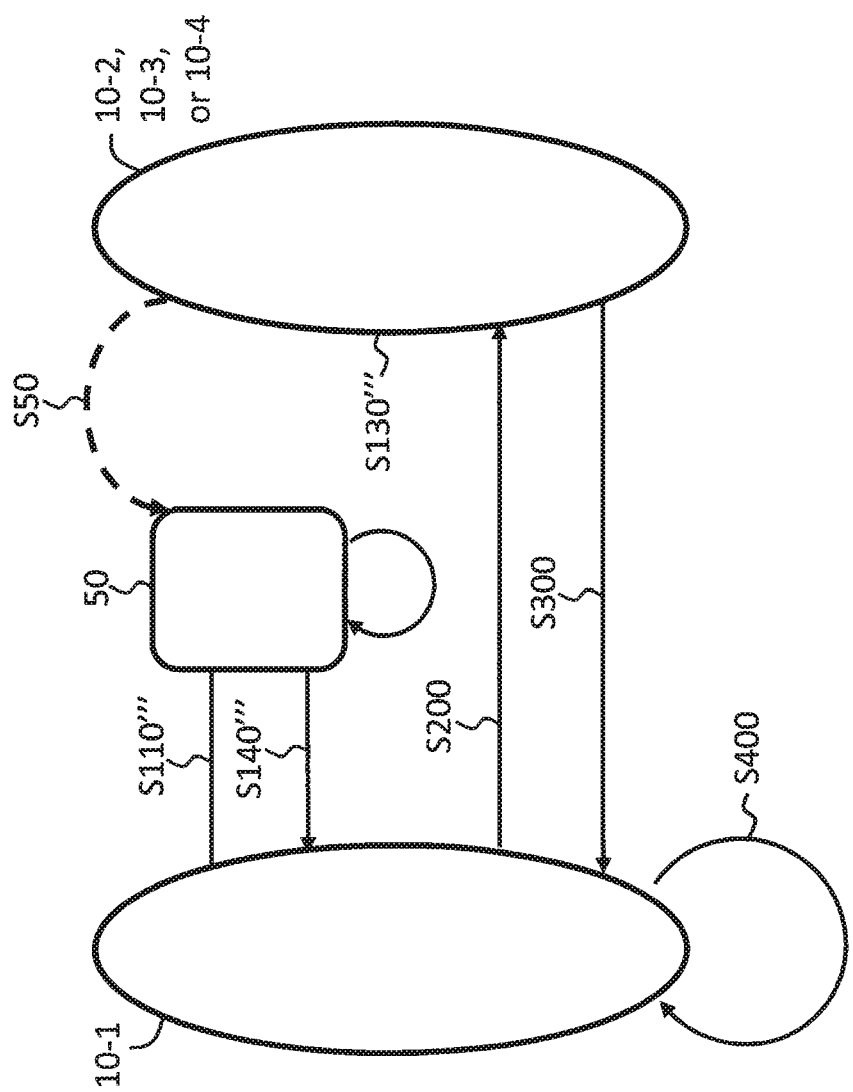
FIG. 3C is a diagram illustrating a task execution method using available resources of collaborative mobile devices in which the collaborative mobile devices are determined via a server device, according to an exemplary embodiment.

Referring to FIG. 3C, in an exemplary embodiment, each of the neighboring mobile devices 10-2 to 10-4 may broadcast its resource information with an ID (e.g., index) over a wireless network (e.g., a network based on CDMA, GSM, wideband CDMA, CDMA-2000, TDMA, LTE, wireless LAN, Bluetooth, or the like), even if the query from the server device 50 is not received. For example, referring to FIG. 3C, the target mobile device 10-1 may communicate a query requesting available resources of the neighboring mobile devices 10-2 to 10-4 to the server device 50 (S110''') over the wireless network other than the mobile ad-hoc network. In this case, the resource information of the neighboring mobile devices 10-2 to 10-4 may be provided (e.g., broadcasted) (S50) prior to the above step S110'''. The server device 50 may determine collaborative mobile devices based on the resource information (S130''') and provide IDs of the collaborative mobile devices with the target mobile device 10-1 over the wireless network other than the mobile ad-hoc network (S140'''). The target mobile device 10-1 may receive the IDs of the collaborative mobile devices from the server device 50 over the wireless network other than the mobile ad-hoc network (S140"). In addition, the target mobile device 10-1 may assign tasks, which are required to be executed, to the collaborative mobile devices and request executions of the tasks based on the received IDs of the collaborative mobile devices over the mobile ad-hoc network (S200). In addition, each collaborative mobile device may execute a corresponding task assigned thereto and provide execution results of the tasks with the target mobile device 10-1 over the mobile ad-hoc network (S300), and the target mobile device 10-1 may merge (e.g., combine) the execution results of the tasks (S400). In an embodiment, the steps S300 and S400 may be conducted over the wireless network other than the mobile ad-hoc network.

Figure 4A:
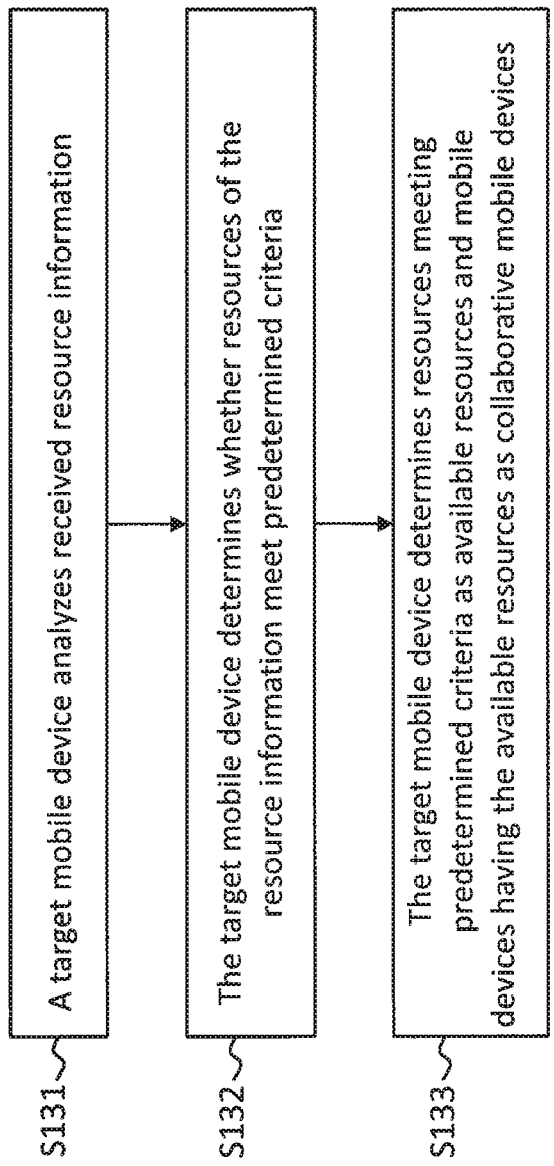
FIG. 4A is a flowchart illustrating a method of determining collaborative mobile devices by a target mobile device according to an exemplary embodiment.

FIG. 4A is a flowchart illustrating a method of determining collaborative mobile devices by a target mobile device according to an exemplary embodiment. For example, referring to FIG. 4A, determination of the collaborative mobile devices may be made based on communications among peer mobile devices (e.g., mobile devices 10-1 to 10-4), as illustrated in FIG. 2A.

Referring to FIG. 4A, the target mobile device 10-1 may analyze the resource information obtained by conducting the step S120 (S131). In addition, the target mobile device 10-1 may determine whether resources included in the resource information meet predetermined criteria (S132), determine resources which meet the predetermined criteria as available resources, and determine mobile devices having the available resources as collaborative mobile devices (S133). Exemplary embodiments of the predetermined criteria and as to how the predetermined criteria is used to determine the collaborative mobile devices will be described in more detail with reference to FIG. 7.

Figure 4B:
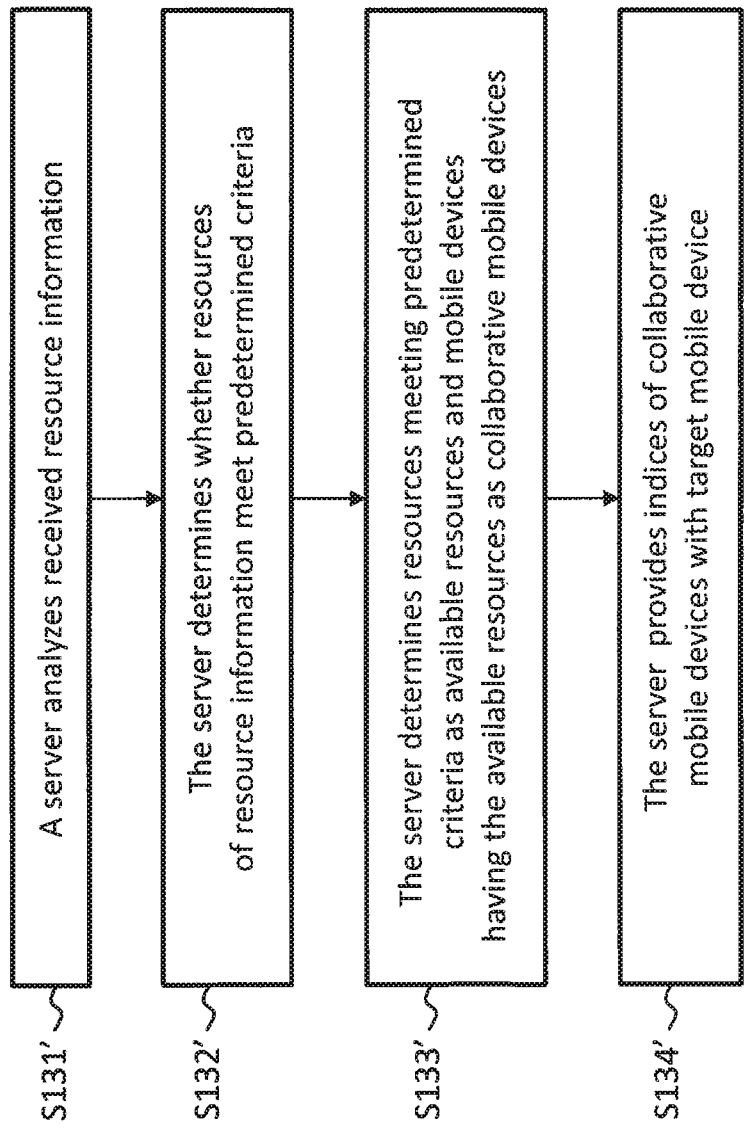
FIG. 4B is a flowchart illustrating a method of determining collaborative mobile devices by a server device according to an exemplary embodiment.

FIG. 4B is a flowchart illustrating a method of determining collaborative mobile devices by a server device according to an exemplary embodiment. For example, referring to FIG. 4B, determination of the collaborative mobile devices may be made via the server device 50, as illustrated in FIG. 3B or 3C.

Referring back to FIG. 4B, the server device 50 may analyze the resource information obtained by conducting the step S120" or S50 (S131'). In addition, the server device 50 may determine whether resources included in the resource information meet predetermined criteria (S132'), determine resources which meet the predetermined criteria as available resources, and determine mobile devices having the available resources as collaborative mobile devices (S133'). The server device 50 may provide IDs of the collaborative mobile devices with the target mobile device 10-1.

Figure 5:
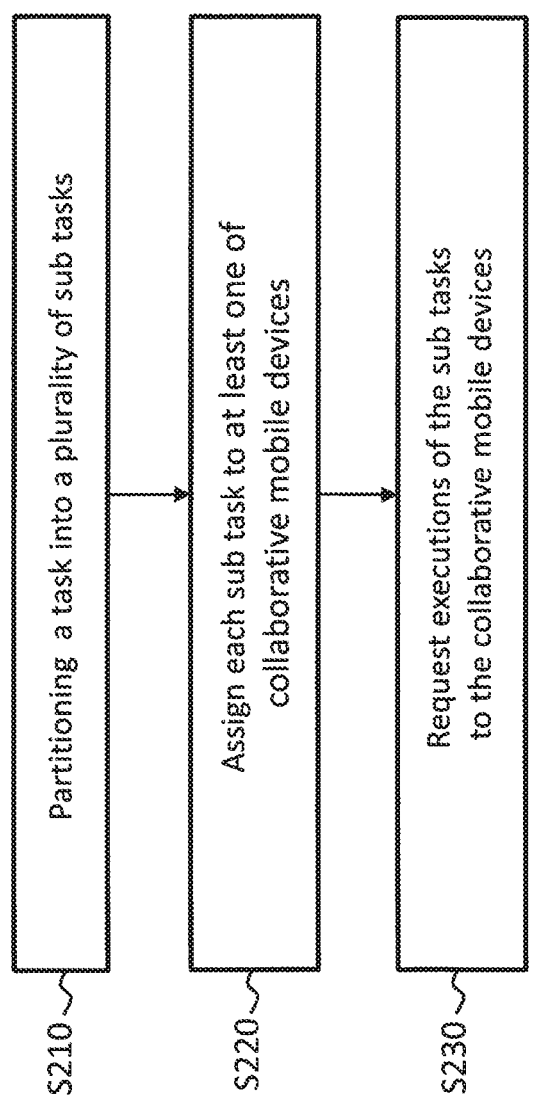
FIG. 5 is a flowchart illustrating a step S200 of FIG. 2A according to an exemplary embodiment.

Referring to FIG. 5, in an exemplary embodiment, the above-mentioned step S200 may include partitioning (e.g., dividing) a task, which is required to be executed, into a plurality of sub tasks (S210), assigning each sub task, partitioned from the task, to at least one of the collaborative mobile devices having the available resources (S220), and requesting executions of the sub tasks to the collaborative mobile devices (S230).

Figure 6:
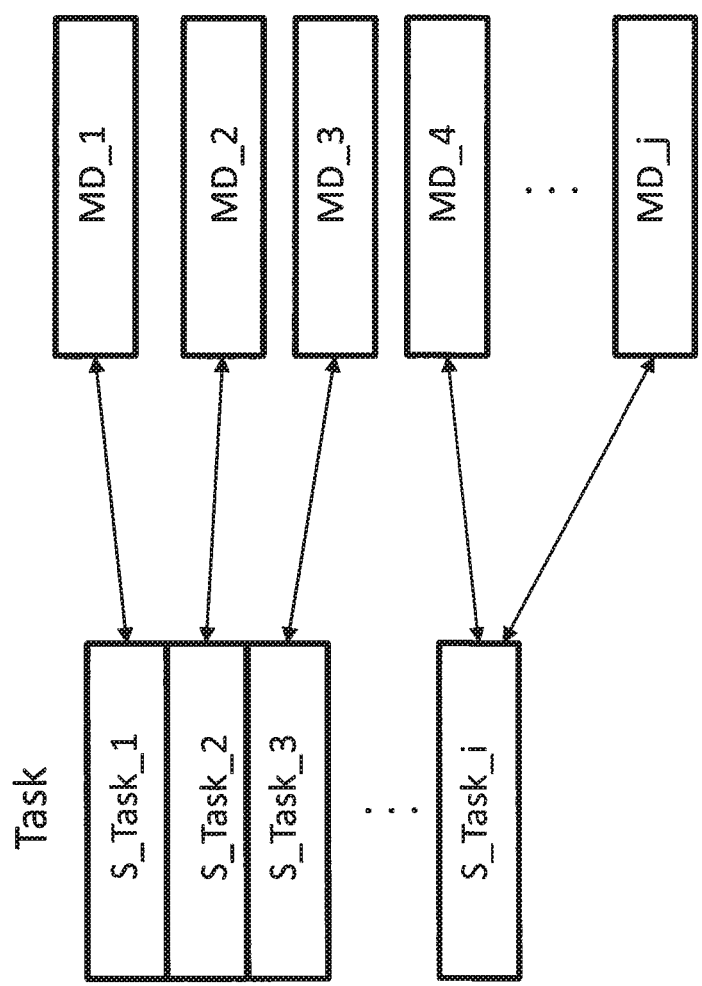
FIG. 6 is a diagram illustrating a method of partitioning a task into a plurality of sub tasks and assigning the partitioned sub tasks to collaborative mobile devices according to an exemplary embodiment.

FIG. 6 is a diagram illustrating a method of partitioning a task and assigning the partitioned task to collaborative mobile devices according to an exemplary embodiment.

Referring to FIG. 6, a target mobile device (e.g., 10-1) may partition a task, which is required to be executed, into a plurality of sub tasks Sub_Task_1 to Sub_Task_i and assign each sub task to at least one of the collaborative mobile devices MD_1 to MD_j. The collaborative mobile devices of FIG. 6 may be mobile devices which have been determined based on the method described with reference to FIG. 4A or 4B. Here, i and j are integers greater than one. Some sub tasks (e.g., S_Task_i) may be assigned to more than one mobile device (e.g., MD_4 to MD_j of FIG. 6). For example, the task may include running of a mobile application, a computation, storage of data, or the like.

FIG. 7 is a diagram illustrating examples of resource information according to an exemplary embodiment.

Referring to FIG. 7, the resource information may include IDs of neighboring mobile devices 10-2 to 10-4. In addition, the resource information may further include types of resources and statuses (or sizes) of the resources which correspond to each ID of the neighboring mobile devices 10-2 to 10-4.

For example, the neighboring mobile device 10-2 has an index 2 and resources such as a processor, mobile applications installed therein, a battery level, or the like. In the neighboring mobile device 10-2, a processor usage ratio is 0% (e.g., an idle status), installed mobile applications includes first to fourth applications APP1 to APP4 (e.g., Instagram®, Youtube®, GoogleMap, or the like), and a remained batter power level is 90%. Similarly, for example, in the neighboring mobile device 10-3 having an index 3, a processor usage ratio is 50%, installed mobile applications include the first to third applications APP1 to APP3, and a remained batter power level is 100%. Similarly, for example, in the neighboring mobile device 10-4 having an index 4, a processor usage ratio is 0%, the installed mobile applications include the second to fourth applications APP2 to APP4, and a remained batter power level is 100%. However, exemplary resources of the present disclosure are not limited thereto.

Referring back to FIGS. 4A and 4B, the predetermined criteria may be associated with whether statuses or sizes corresponding to the resources of each neighboring mobile device 10-2, 10-3, or 10-4 are greater or smaller than predetermined values.

In an embodiment, if a target mobile device 10-1 has a task for running the first application APP1, a first criterion applied for the determination of the collaborative mobile devices may be whether or not the neighboring mobile devices 10-2 to 10-4 have the first application APP1 installed. Based on the resource information as shown in FIG. 7, it may be determined that the mobile devices 10-2 and 10-3 meet this criterion. In addition, a second criterion may be whether a processor usage ratio (e.g., in percentage) is lower than a predetermined threshold (e.g., 20%), and a third criterion may be whether a remained battery level (e.g., in percentage) is higher than a predetermined value (e.g., 80%). Since the mobile device 10-2 having the installed first application APP1, the processor usage ratio of 0%, and the remained battery power level of 90% meets all of the above criteria, the mobile device 10-2 may be selected to be a collaborative mobile device. Exemplary embodiments of the present disclosures are not limited thereto.

In an embodiment, the collaborative mobile devices are selected by comparing statuses or sizes of the resources of the neighboring mobile devices 10-2 to 10-4 with those of the target mobile device 10-1. For example, when the statuses or sizes of the resources of the mobile device 10-2 are better or greater than those of the target mobile device 10-1, the mobile device 10-2 is selected to be a collaborative mobile device. When the statuses or sizes of the resources of the mobile device 10-2 are neither better nor greater than those of the target mobile device 10-1, the mobile device 10-2 is not selected to be a collaborative mobile device.

Figure 8B:
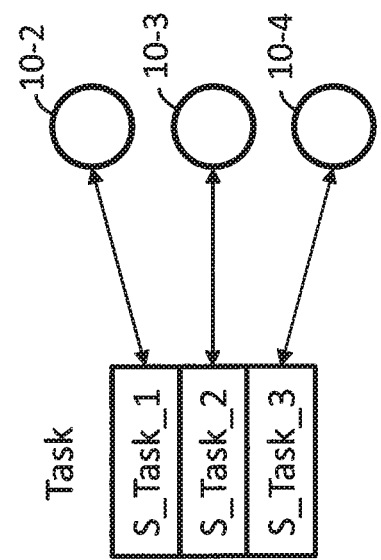
FIG. 8B illustrates an example of assigning a plurality of sub tasks, which are obtained through the step S210 of partitioning a task to be executed, to the collaborative mobile devices according to an exemplary embodiment.
Figure 8A:
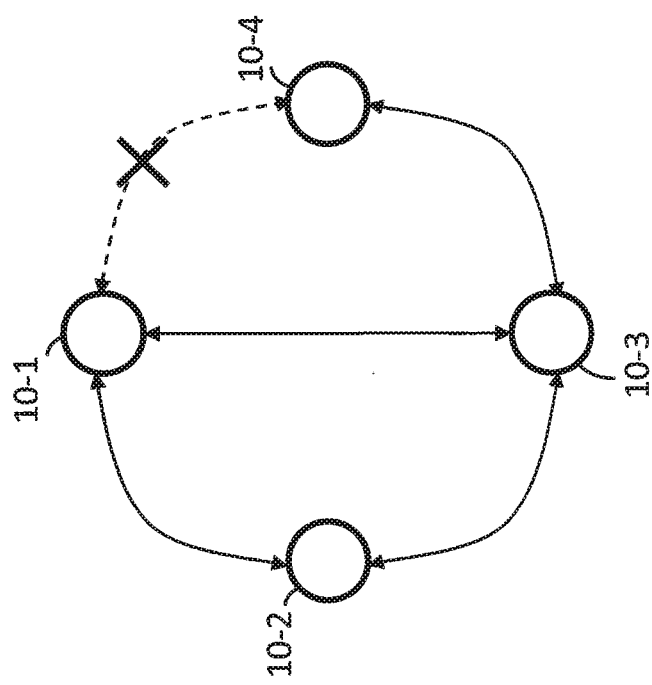
FIG. 8A is a diagram illustrating a task execution method using collaborative mobile devices when a target mobile device is disconnected with one of the collaborative mobile devices before an execution result of at least one sub task is not received, according to an exemplary embodiment.

FIG. 8A is a diagram illustrating a task execution method using collaborative mobile devices when a target mobile device is disconnected with one of the collaborative mobile devices before an execution result of at least one sub task is not received, according to an exemplary embodiment. FIG. 8B illustrates an example of assigning a plurality of sub tasks, which are obtained through the step S210 of partitioning a task to be executed, to the collaborative mobile devices according to an exemplary embodiment.

Referring to FIG. 2A, it is assumed that the determination of the collaborative mobile devices (S100) and the assignment of tasks and request of executions of the tasks to the collaborative mobile devices (S200) have been conducted. In particular, the determination of the collaborative mobile devices (S100) may be conducted based on a method described with reference to FIG. 3A, 3B, or 3C.

Although FIG. 8A illustrates that the target mobile device 10-1 communicates directly with each of the mobile devices 10-2 to 10-4, it is only an embodiment of the present disclosure, and the present disclosure includes an embodiment of FIG. 1B in which the target mobile device 10-1 directly communicates with the mobile devices 10-2 and 10-4 and does not directly communicate with the mobile device 10-3. However, the present disclosure is not limited thereto. Duplicate descriptions thereof will be omitted for the sake of simplicity.

In addition, referring to FIGS. 8A and 8B, it is assumed that the plurality of sub tasks includes first to third sub tasks S_Task_1 to S_Task_3 and neighboring mobile devices 10-2 to 10-4 are determined as the collaborative mobile devices. The first to third sub tasks S_Task_1 to S_Task_3 may be assigned to the collaborative mobile devices 10-2 to 10-4, respectively.

After the steps S100 and S200 are conducted, the target mobile device 10-1 may wait for reception of execution results of the plurality of sub tasks S_Task_1 to S_Task_3, each of which is subjected to be executed by a corresponding one of the collaborative mobile devices 10-2 to 10-4.

For example, the target mobile device 10-1 may be disconnected with the mobile device 10-4 before receiving the execution result of the third sub task S_Task_3 which has been assigned to the mobile device 10-4. In this case, the target mobile device 10-1 may defer operation of merging the execution results of the sub tasks S_Task_1 to S_Task_3. Instead, the target mobile device 10-1 may search a replacing collaborative mobile device for execution of the third sub task.

For example, the target mobile device 10-1 may request the execution of the third sub task S_Task_3 to at least one of the collaborative mobile devices 10-2 and 10-3 other than the mobile device 10-4.

In an exemplary embodiment, the target mobile device 10-1 may obtain IDs of new collaborative mobile devices based on a method described with reference to FIG. 3A, 3B, or 3C, and thus, utilize the new collaborative mobile devices for the execution of the third sub task S_Task_3.

In FIGS. 8A and 8B, it is illustrated that a single mobile device is disconnected before the receiving of execution results of all the sub tasks, however the present disclosure is not limited thereto, and the number of disconnected mobile devices may be greater than one.

Figure 9:
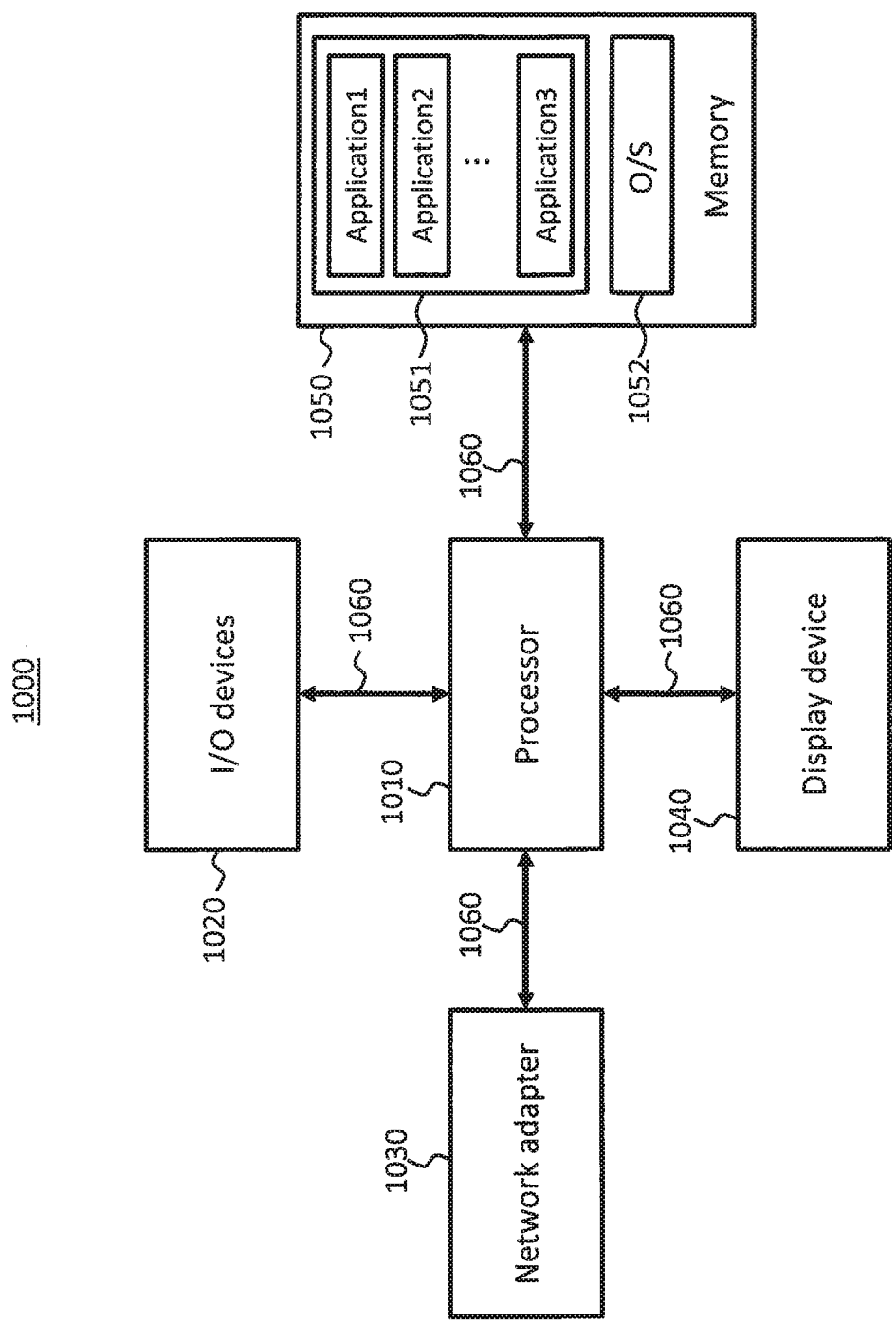
FIG. 9 is a block diagram illustrating a mobile computing system according to an exemplary embodiment.

FIG. 9 is a block diagram illustrating a mobile computing system 1000 according to an exemplary embodiment. FIG. 10 is a block diagram illustrating a server computing system 2000 according to an exemplary embodiment.

The mobile computing system 1000 may be implemented as an example of the mobile device 10-1, 10-2, 10-3, or 10-4.

In addition, the mobile computing system 1000 may be implemented with a ultra-mobile personal computer (UMPC), a workstation, a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

The server computing system 2000 may be implemented as an example of the server device 50. The server computing system 2000 may include the examples of the mobile computing system 1000 as described above, and further include stationary computing systems having more plentiful resources in computations and electrical power sources.

Referring to FIG. 9, the mobile computing system 1000 may include a processor 1010, I/O devices 1020, a network adaptor 1030, a display device 1030, and a memory system 1050.

The processor 1010 may drive the I/O devices 1020, the network adaptor 1030, the display device 1030, and the memory system 1050 through a bus 1060. The memory system 1050 may include a plurality of application programs 1051 and an operating system (O/S) 1052.

Referring to FIG. 10, the server computing system 2000 may include a processor 2010, I/O devices 2020, a network adaptor 2030, a display device 2030, and a memory system 2050.

The processor 2010 may drive the I/O devices 2020, the network adaptor 2030, the display device 2030, and the memory system 2050 through a bus 2060.

The bus (e.g., 1060 or 2060) in each of the mobile computing system 1000 and the server computing system 2000 may represent one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, micro channel architecture (MCA) bus, enhanced ISA (EISA) bus, video electronics standards association (VESA) local bus, and peripheral component interconnects (PCI) bus.

Each of the mobile computing system 1000 and the server computing system 2000 may include a program module for performing the above-described methods according to exemplary embodiments. For example, the program module may include routines, programs, objects, components, logic, data structures, or the like, for performing particular tasks or implement particular abstract data types. The processor (e.g., 1010 or 2010) of the mobile computing system 1000 and the server computing system 2000 may execute instructions written in the program module to perform the above-described methods according to exemplary embodiments. The program module may be programmed into the integrated circuits of the processor (e.g., 1010 or 2010). In an exemplary embodiment, the program module may be stored in the memory system (e.g., 1050 or 2050) or in a remote computer system storage media.

Each of the mobile computing system 1000 and the server computing system 2000 may include a variety of computing system readable media. Such media may be any available media that is accessible by the computer system (e.g., 1000 or 2000), and it may include both volatile and non-volatile media, removable and non-removable media.

The memory system (e.g., 1050 or 2050) can include computer system readable media in the form of volatile memory, such as random access memory (RAM) and/or cache memory or others. The computer system (e.g., 1000 or 2000) may further include other removable/non-removable, volatile/non-volatile computer system storage media.

The computer system (e.g., 1000 or 2000) can communicate with one or more devices using the network adapter (e.g., 1030 or 2030). The network adapter (e.g., 1030 or 2030) may support wired communications based on a local area network (LAN), a wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, or the like. For example, the network adaptor (e.g., 1030 or 2030) may include a Bluetooth adaptor and a WiFi adaptor.

Exemplary embodiments of the present disclosure may include a system, a method, and/or a computer program product. The computer program product may include a non-transitory computer readable storage medium (e.g., the memory system 1050 or 2050) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing systems (e.g., 1000 or 2000) from the computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge servers. A network adapter card (e.g., 1030 or 2030) or network interface in each computing/processing device receives computer readable program instructions from the network and forwards the computer readable program instructions for storage in a computer readable storage medium within the respective computing systems.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computer system (e.g., 1010 or 2010) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method for collaboratively executing a task using first to N-th mobile devices wirelessly connected in a mobile ad-hoc network, wherein the first mobile device has the task to be executed and N is an integer greater than one, comprising:
   receiving, by a server device, resource information of the second to N-th mobile devices;
   determining, by the server device, collaborative mobile devices out of the second to N-th mobile devices based on the received resource information of the second to N-th mobile devices;
   providing, by the server device, identifications of the determined collaborative mobile devices with the first mobile device;
   dividing, by the first mobile device, the task into first to M-th sub tasks, wherein M is an integer greater than one;
   assigning, by the first mobile device, each of the first to M-th sub tasks to at least one of the collaborative mobile devices, wherein a first sub task is assigned to a wirelessly connected first collaborative mobile device for execution;
   requesting, by the first mobile device, executions of the first to M-th sub tasks at the collaborative mobile devices;
   receiving, by the first mobile device, execution results of the first to M-th sub tasks from the collaborative mobile devices;
   detecting, by the first mobile device, a disconnection between the first mobile device and the first collaborative mobile device of the collaborative mobile devices before an execution result on the first sub task is not received; and
   requesting, by the first mobile device, an execution of the first sub task to at least one of the collaborative mobile devices other than the first collaborative mobile device in response to detecting the disconnection.

2. The method of claim 1, further comprising:
   combining, by the first mobile device, the execution results of the first to M-th sub tasks one with another in response to completion of the requested executions.

3. The method of claim 2, further comprising:
   deferring, by said first mobile device, said combining of execution results in response to detecting the disconnection.

4. The method of claim 1, wherein the determining collaborative mobile devices comprises:
   querying, by the first mobile device, available resources of the second to N-th mobile devices to the server device, prior to the receiving resource information of the second to N-th mobile devices.

5. The method of claim 1, wherein the determining the collaborative mobile devices based on the received resource information comprises:
   analyzing, by the server device, the received resource information;
   determining, by the server device, whether first resources of the resource information meet predetermined criteria;
   determining, by the server device, the first resources meeting the predetermined criteria as the available resources; and
   determining, by the server device, mobile devices having the first resources out of the second to N-th mobile devices as the collaborative mobile devices.

6. The method of claim 1, wherein the resource information includes IDs of the second to N-th mobile devices.

7. The method of claim 1, further comprising:
   receiving, by the first mobile device, an execution result on the first sub task; and
   combining, by the first mobile device, the execution result on the first sub task with the execution results on the second to M-th sub task.

8. A network system of collaboratively executing a task, comprising:
   first to N-th mobile devices and a server device, wherein N is an integer greater than one, and the first to N-th mobile devices are wirelessly connected to constitute a mobile ad-hoc network,
   wherein the first mobile device has the task to be executed, queries available resources of the second to N-th mobile devices to the server device, receives identifications (IDs) of collaborative mobile devices, divides the task into first to M-th sub tasks (wherein M is an integer greater than one), assigns each of the first to M-th sub tasks to at least one of the collaborative mobile devices, wherein a first sub task is assigned to a first collaborative mobile device for execution, requests executions of the first to M-th sub tasks to the collaborative mobile devices, receives execution results of the first to M-th sub tasks from the collaborative mobile devices, said first mobile device further detecting a disconnection between the first mobile device and the wirelessly connected first collaborative mobile device of the collaborative mobile devices before an execution result on the first sub task is not received, and request an execution of the first sub task to at least one of the collaborative mobile devices other than the first collaborative mobile device in response to detecting the disconnection, wherein the server device receives resource information from the second to N-th mobile devices in response to querying from the first mobile device, determines the collaborative mobile devices out of the second to N-th mobile devices based on the received resource information, and provides the IDs of the collaborative mobile devices to the first mobile device, and wherein each of the collaborative mobile devices executes at least one of the assigned first to M-th sub tasks and provides execution results with the first mobile device.

9. The system of claim 8, wherein the first mobile device combines the execution results of the first to M-th sub tasks one with another in response to completion of the requested executions.

10. The system of claim 9, wherein the first mobile device defers said combining of execution results in response to detecting the disconnection.

11. The system of claim 8, wherein the server device determines the collaborative mobile devices by:
analyzing the received resource information;
determining whether first resources of the resource information meet predetermined criteria;
determining the first resources meeting the predetermined criteria as the available resources; and
determining mobile devices, having the first resources, out of the second to N-th mobile devices as the collaborative mobile devices.

12. The system of claim 8, wherein the predetermined criteria is provided based on resources of the first mobile device or a volume of the task.

13. The system of claim 8, wherein the task is a mobile application program.

14. A computer program product stored in a non-transitory computer-readable storage medium having computer readable program instructions, the computer readable program instructions read and carried out by a first processor and a second processor for performing a method of collaboratively executing a task using first to N-th mobile devices wirelessly connected in a mobile ad-hoc network, wherein the method comprises:
receiving, by a server device comprising the first processor, resource information of the second to N-th mobile devices;
determining, by the server device, collaborative mobile devices out of the second to N-th mobile devices based on the received resource information of the second to N-th mobile devices;
providing, by the server device, identifications of the determined collaborative mobile devices with the first mobile device;
dividing, by the first mobile device comprising the second processor, the task into first to M-th sub tasks, wherein M and N are integers greater than one;
assigning, by the first mobile device, each of the first to M-th sub tasks to at least one of the collaborative mobile devices, wherein a first sub task is assigned to a wirelessly connected first collaborative mobile device for execution;
requesting, by the first mobile device, executions of the first to M-th sub tasks to the collaborative mobile devices;
receiving, by the first mobile device, execution results of the first to M-th sub tasks from the collaborative mobile devices;
detecting, by the first mobile device, a disconnection between the first mobile device and the first collaborative mobile device of the collaborative mobile devices before an execution result on the first sub task is not received; and
requesting, by the first mobile device, an execution of the first sub task to at least one of the collaborative mobile devices other than the first collaborative mobile device in response to detecting the disconnection.

15. The computer program product of claim 14, wherein the method further comprises combining, by the first mobile device, the execution results of the first to M-th sub tasks one with another in response to completion of the requested executions.

16. The computer program product of claim 15, wherein the method further comprises:
deferring, by said first mobile device, said combining of execution results in response to detecting the disconnection.

17. The computer program product of claim 14, wherein the determining collaborative mobile devices comprises:
querying, by the first mobile device, available resources of the second to N-th mobile devices.

18. The computer program product of claim 17, wherein the determining the collaborative mobile devices based on the received resource information comprises:
analyzing, by the server device, the received resource information;
determining, by the server device, whether first resources of the resource information meet predetermined criteria;
determining, by the server device, the first resources meeting the predetermined criteria as the available resources; and
determining, by the server device, mobile devices; having the first resources; out of the second to N-th mobile devices as the collaborative mobile devices.

19. The computer program product of claim 14, wherein the method further comprises:
receiving, by the first mobile device, an execution result on the first sub task; and
combining, by the first mobile device, the execution result on the first sub task with the execution results on the second to M-th sub task.

* * * * *